United States Patent [19]
Chase et al.

[11] Patent Number: 5,564,791
[45] Date of Patent: Oct. 15, 1996

[54] WHEEL AND OVERLAY ASSEMBLY TO ACCOMMODATE BALANCE WEIGHTS

[75] Inventors: Lee A. Chase, Ada; Kevin P. Burch, Warren, both of Mich.

[73] Assignee: Lacks Industries, Inc., Grand Rapids, Mich.

[21] Appl. No.: 465,793

[22] Filed: Jun. 6, 1995

[51] Int. Cl.$^6$ .............................. B60B 7/00; B60B 19/00
[52] U.S. Cl. ........................................ 301/5.21; 301/37.43
[58] Field of Search ............................ 301/5.21, 37.1, 301/37.42, 37.43

[56] References Cited

U.S. PATENT DOCUMENTS

| | | | |
|---|---|---|---|
| 2,522,024 | 9/1950 | Englehart | 301/5.21 |
| 2,714,039 | 7/1955 | Pouell | 301/5.21 |
| 2,926,953 | 3/1960 | Lyon . | |
| 2,926,954 | 3/1960 | Lyon | 301/5.21 |
| 5,368,370 | 11/1994 | Beamr | 301/37.43 |
| 5,435,631 | 7/1995 | Maloney et al. | 301/37.42 X |

*Primary Examiner*—Russell D. Stormer
*Attorney, Agent, or Firm*—Remy J. VanOphem; John VanOphem; Thomas A. Meehan

[57] ABSTRACT

A wheel and overlay assembly having an overlay that extends to the perimeter of the wheel in order to maximize the aesthetic effect of the overlay, while also accommodating balance weights at the perimeter in order to permit proper balancing of the assembly. The result is a wheel and overlay assembly having a fully integrated appearance in which the two-piece construction of the assembly is more fully concealed. The wheel and overlay assembly is an improvement over prior art assemblies which use an overlay of the type formed separately from the wheel, and particularly overlays formed as a solid plastic panel member that is directly attached to the outboard surface of a wheel. Furthermore, the invention is applicable to both aluminum and steel wheels of the type currently existing in the industry, as well as standardized balance weights utilized in the industry.

20 Claims, 2 Drawing Sheets

WHEEL AND OVERLAY ASSEMBLY TO ACCOMMODATE BALANCE WEIGHTS

BACKGROUND OF THE INVENTION

1. Field of the Invention

The present invention generally relates to automobile wheels equipped with decorative overlays. More specifically, this invention relates to a wheel and overlay assembly in which the overlay extends radially outward to the flange of the wheel so as to cover the entire outboard surface of the wheel, and the wheel flange and overlay are complementarily configured to enable a standard balance weight to be secured to the wheel flange.

2. Description of the Prior Art

Decorative overlays are widely used to enhance the aesthetic appearance of automotive wheels. Overlays are not only employed to improve the appearance of unadorned standard steel wheels, but are also used with cast aluminum wheels, which are known to be difficult to plate with chromium. A wheel and overlay assembly of a type known in the prior art is illustrated in FIG. 1. The assembly is generally composed of an overlay 16 secured to the wheel's outboard surface, defined here by a wheel disk 14 to which a rim portion 12 is welded. The wheel further includes a rim flange 10 that projects in a radially outward direction from the wheel, terminating in a flange lip 20 that extends axially from the rim flange 10 in an outboard direction, such that the flange lip 20 circumscribes the outboard surface of the wheel. As the term is used herein, the flange lip 20 does not form a part of the wheel's outboard surface, which denotes the generally radially extending surface of the wheel on the laterally outward side of a vehicle to which the wheel is mounted. As is conventional, a balance weight 24 is shown as being mounted to the rim flange 10 for the purpose of balancing the wheel assembly.

The overlay 16 shown in FIG. 1 is particularly of the type taught by Chase in U.S. patent application Ser. No. 07/904,180, filed Jun. 25, 1992, entitled "Chromium-Plated Composite Wheel" now abandoned and U.S. patent application Ser. No. 08/312,144, filed Sep. 26, 1994, entitled "Heat-Resistant Overlay for an Automotive Steel Wheel", both of which are assigned to Lacks Industries, Inc., the assignee hereof. As such, the overlay 16 is a metal plated or painted plastic panel that is formed independently and separately from the wheel. The overlay is permanently adhered directly to the outboard surface of the wheel, preferably with a high temperature adhesive such as a silicone or polyurethane. Notably, the disclosed metal plating process enables the overlay 16 to closely conform to the outboard surface and cover high temperature regions of the wheel that conventional overlays are incapable of withstanding.

While the overlay 16 of FIG. 1 has distinct advantages over previous overlays and assembly methods, a shortcoming is that the radially outward edge 22 of the overlay 16 must extend short of the flange lip 20 of the rim flange 10 so as to enable the wheel balance weight 24 to be secured to the flange lip 20. As those skilled in the art are aware, balance weights are manufactured in standardized configurations in order to permit interchangeability with various wheel designs. Four of the more common standardized types are letter coded as P, C and T types, adapted to be mounted to steel wheels, and the MC type, adapted to be mounted to cast aluminum wheels. In order for the balance weight 24 to be reliably secured to the flange lip 20 with an interference fit, certain dimensions of the balance weight 24 and rim flange 10 must be within appropriate tolerances. For such purposes, the Society of Automotive Engineers (SAE) has adapted standards for MC type wheels as well as for the most common type steel wheels. As identified in FIG. 1, such dimensions include the flange lip thickness "T", measured in a radial direction relative to the wheel; the flange width "W", defined as the distance in the axial direction of the wheel from the outboard tip of the flange lip 20 to the inboard surface of the rim flange 10; and the flange offset "O", defined as the distance in the axial direction of the wheel from the outboard tip of the flange lip 20 to the outboard surface of the rim flange 10. The key dimensions for the balance weight 24 are the thickness of the weight measured in the axial direction when installed, and the gap width between the base portion of the weight and the inner diameter of the weight's clip 30. The flange offset "O" and balance weight thickness are critical for accommodating the balance weight 24 on the rim flange 10, while the flange thickness "T" and the clip's gap width are critical for achieving an adequate interference fit in order to retain the balance weight 24 on the rim flange 10. As will be apparent, the weight's interference fit is dependent on the ability of the flange offset "O" to fully accommodate the balance weight 24 on the rim flange 10.

In the prior art, standard flange and balance weight dimensions have prevented overlays such as the overlay 16 of FIG. 1 from extending up to the flange lip 20, in that doing so would prevent a standard balance weight 24 from being positioned sufficiently onto the flange lip 20 in order to gain the full benefit of the interference fit between the balance weight clip 30 and the flange lip 20. Because of the limited coverage of the wheel's outboard surface by the overlay 16, the resulting styling effect of the wheel assembly of FIG. 1 is somewhat less than optimum, particularly if the overlay 16 is chromium plated and therefore conspicuously contrasts the dull surface of the wheel. Another consequence is that, because a portion of the outboard surface remains visible, the two-piece construction of the wheel assembly is betrayed, diminishing the wheel assembly's perceived value. Another possible effect is that the wheel assembly may appear smaller to a casual observer, contrary to the styling objectives of many designers.

U.S. Pat. No. 2,926,953 to Lyon overcomes some of the above-noted shortcomings by disclosing a wheel cover that extends out to the wheel flange so as to conceal essentially the entire outboard surface of the wheel. However, the wheel cover lacks the significant aesthetic and structural advantages of an overlay that is directly and permanently bonded to the wheel's outboard surface, such as the type taught by Chase. Furthermore, the wheel cover necessitates the use of balance weights that are not of a standardized type. As such, there is considerable reluctance in the industry to adopt a solution such as Lyon's, particularly in view of the difficulty with which such an approach would be implemented by automobile service facilities.

Accordingly, what is needed is a wheel and overlay assembly that is specifically configured to enable the overlay to completely cover the outboard surface of the wheel so as to maximize the overlay's intended decorative effect, while also enabling standard balance weights to be readily and reliably mounted to the wheel's rim flange so as to permit proper balancing of the wheel and overlay assembly.

SUMMARY OF THE INVENTION

According to the present invention there is provided a wheel and overlay assembly, in which the overlay is permitted to extend to the outer diameter of the wheel in order to maximize the aesthetic effect of the overlay, while also accommodating balance weights at the perimeter of the wheel in order to permit proper balancing of the assembly. The result is a wheel and overlay assembly having a fully integrated appearance in which the two-piece construction of the assembly is more fully concealed. The wheel and overlay assembly is an improvement over prior art assemblies which use an overlay of the type formed separately from the wheel, and particularly overlays formed as a solid plastic panel member that is directly attached to the outboard surface of a wheel using mechanical attachment techniques. Furthermore, the invention is applicable to both aluminum and steel wheels of the type currently existing in the industry, as well as standardized balance weights utilized in the industry.

The wheel and overlay assembly of this invention generally includes a wheel having an outboard surface to which an overlay is permanently secured, and one or more balance weights mounted to the assembly. As is conventional, the balance weight is preferably one of any standardized type, including P, C, T and MC-type balance weights. The wheel includes a rim flange that is formed at an outer peripheral region of the outboard surface. The flange has an axially-extending flange lip with a radially inward surface and an outboard distal edge that is offset from the wheel's outboard surface, as measured in the wheel's axial direction, by a predetermined offset dimension. The overlay has an outer peripheral portion that covers at least a portion of the flange at the outer peripheral region of the outboard surface, and preferably extends up to the flange lip such that substantially the entire outboard surface of the wheel is covered by the overlay.

In order to accommodate the balance weight on the flange lip, the wheel flange is formed such that the offset dimension of the flange lip is sufficient to accommodate both a standard balance weight and the thickness of the outer peripheral portion of the overlay. As such, the outer peripheral portion of the overlay is sandwiched between the flange and the balance weight. Co-pending patent application no. 08/467,700, filed Jun. 6, 1995, concurrently herewith, entitled "Wheel and Overlay Assembly" owned by the common assignee hereof, addresses various alternatives as to controlling the gap between the overlay and the wheel flange near the rim thereof. Accordingly, for such purpose the disclosure of the co-pending application is incorporated herein by reference.

As described above, the outer peripheral portion of the overlay can be limited to radially extend up to, but not over, the flange lip, such that the radially inward surface of the flange lip remains exposed. While the overlay does not completely cover the exposed surfaces of the wheel, coverage is significantly greater than that made possible with prior art overlays, yielding a wheel and overlay assembly having a significantly enhanced aesthetic appearance.

In a further embodiment, the outer peripheral portion of the overlay includes an axially-extending overlay lip circumscribing the overlay and configured to cover the radially inward surface of the flange lip. The flange lip is configured to have a thickness in the radial direction such that, when combined with the radial thickness of the overlay lip, it enables a standard balance weight to be mounted to the wheel and overlay assembly such that the overlay lip is sandwiched between the flange lip and the balance weight. A further variation of this embodiment is to provide an adhesive between the overlay lip and the flange lip in order to exclude water and dirt from between the wheel and overlay. Another variation of this embodiment is to form a radially outward extending projection on the overlay lip for engaging the flange lip so as to close the border between the overlay and wheel. Alternatively, a radially inward extending projection can be formed on the radially inward surface of the flange lip for engaging the overlay lip, thereby forming a recess in the radially inward surface that can receive an interlocking projection formed on the overlay lip.

In view of the above, it can be seen that a significant advantage of the present invention is that the wheel and overlay assembly is specifically configured to enable the overlay to cover the outboard surface of the wheel to the extent necessary to noticeably enhance the overlay's intended decorative effect, while also enabling standard balance weights to be readily and reliably mounted to the wheel's rim flange so as to permit proper balancing of the wheel and overlay assembly. More particularly, the wheel and overlay are complementarily configured to permit the overlay to extend to the outer diameter of the wheel and, if desired, to cover the outboard portion of the flange lip of the wheel's rim flange in order to maximize the aesthetic effect of the overlay, without altering the dimensional characteristics necessary to allow a standard balance weight to be mounted to the wheel's flange lip. The result is a wheel and overlay assembly whose appearance is dominated by the overlay, and whose two-piece construction is more fully concealed because exposure of the wheel's outboard surface is minimized. As such, the perceived value of the wheel assembly is enhanced.

In addition, the wheel and overlay assembly advantageously utilizes an overlay of the type formed separately from the wheel, such that manufacturing and assembly of the wheel and overlay are facilitated. In particular, the overlay is preferably a solid plastic panel member that can be bonded directly to the outboard surface of both aluminum and steel wheels. As such, the thickness of the overlay and, as discussed in the above referenced co-pending application, any gap between the overlay and wheel can be accurately maintained in a number of ways in order to appropriately accommodate a balance weight. Finally, the wheel and overlay assembly enables the use of standardized balance weights of the type used in the industry, such that specially designed balance weights are unnecessary.

Accordingly, it is an object of the present invention to provide an automotive wheel and overlay assembly, in which the assembly has a multiple-piece construction.

It is another object of the invention to provide a wheel and overlay assembly, in which the wheel and overlay are complementarily configured to enable the overlay to sufficiently cover the wheel's outboard surface so as to conceal the multiple-piece construction of the assembly.

It is still another object of the invention that the overlay extend to the extreme outer peripheral regions of the wheel, including the flange of the wheel where balance weights must be capable of being mounted.

It is a further object of the invention that the wheel and overlay assembly enable the use of standardized balance weights.

It is still a further object of the invention that the thickness of the overlay and any gap between the overlay and wheel be controllable in order to appropriately accommodate a balance weight.

It is yet a further object of the invention that the overlay and/or wheel be configured such that the peripheral interface between the wheel and overlay is sealed, so as to prevent ingress of water and dirt.

Other objects and advantages of this invention will be more apparent after a reading of the following detailed description taken in conjunction with the drawings provided.

DETAILED DESCRIPTION OF THE PREFERRED EMBODIMENT

With reference to FIGS. 2 through 5, there are shown several different embodiments of a wheel assembly for an automobile in accordance with the teachings of this invention. Each of the wheel assemblies has a two-piece construction, in which an overlay of the type formed separately from the wheel is later assembled to the wheel by being directly attached to the outboard surface of the wheel. The overlays can be configured to be attached to either aluminum or steel wheels of the type currently existing in the industry. In accordance with this invention, the wheel assemblies shown in FIGS. 2 through 5 share the common feature of the overlay extending to the outer diameter regions of the wheel in order to maximize the aesthetic effect of the overlay, while also accommodating standard balance weights at the perimeter of the wheel in order to permit proper balancing of the assembly.

Figure 2:
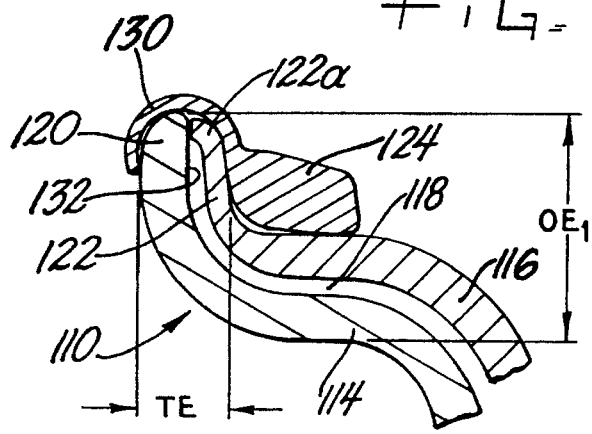
FIGS 2 through 5 show in cross section rim portions of wheel and overlay assemblies in accordance with separate embodiments of this invention.

With reference to FIG. 2, a first embodiment of the invention is illustrated in cross section as a rim portion of a wheel assembly 110. The portion shown includes the rim flange 114 for the wheel member of the assembly 110. As is conventional, the rim flange 114 circumscribes the outboard surface of the wheel assembly 110 and is one of two outer portions of the wheel's rim on which a tire can be mounted. The rim flange 114 generally extends in a radially outward direction from the wheel, terminating in a flange lip 120 that extends axially from the rim flange 114 in an outboard direction. As a result, the flange lip 120 forms a contoured radially inward outboard surface 132 that is roughly perpendicular to the outboard surface of the wheel member.

The wheel assembly 110 further includes an overlay 116 that is preferably a thin gauge, solid plastic panel secured directly to the outboard surface of the wheel. A metal layer is preferably electrochemically plated onto the outboard surface of the overlay 116 so as to contribute an aesthetically pleasing appearance to the wheel assembly 110. In a preferred embodiment, the overlay 116 is formed from an ABS-modified polycarbonate in accordance with U.S. patent application Ser. No. 08/206,037 to Chase et al. Such an overlay 116 and its metal plating are highly resistant to the adverse thermal environment of the wheel assembly 110, even when the overlay 116 is configured to uniformly and closely follow the contours of the outboard surface of the wheel assembly 110, including the rim flange 114, as shown in FIG. 2. In so doing, the outer peripheral portion of the overlay 116 forms an overlay lip 122 that is complementary to the flange lip 120 and conceals the contoured radially inward outboard surface 132 of the flange lip 120 of the wheel. Formed near the distal edge of the overlay lip 122 is a projection 122a that extends in a generally radially outward direction, so as to abut the contoured radially inward outboard surface 132 of the flange lip 120 in such a way that the gap 118 formed between the overlay 116 and the rim flange 114 is minimized. The projection 122a serves to localize and thereby facilitate matching the overlay 116 to the wheel rather than dealing with attempting to control the entire inside wall of the overlay lip 122. Further an adhesive is used to seal the border between the flange and overlay lips 120 and 122 so as to prevent the ingress of water and dirt into the gap 118.

As shown, the wheel assembly 110 is also provided with a balance weight 124 that is mounted to the rim flange 114 for the purpose of balancing the complete wheel assembly (not shown). The portions of the rim flange 114 and flange lip 120 that accommodate the balance weight 124 define a wheel balance weight area of the wheel. As illustrated, the balance weight 124 is a standard T-type weight for a steel wheel, but could be any standardized type, including P and C-type weights for steel wheels and MC-type weights for aluminum wheels. As such, the balance weight 124 has a specified shape whose dimensions are standardized in order to achieve compatibility with standard automotive wheels. Consequently, the gap between the weight clip 130 and the body of the balance weight 124 is also standardized in order to attain a reliable interference fit between the balance weight 124 and the flange lip 120.

Figure 1:
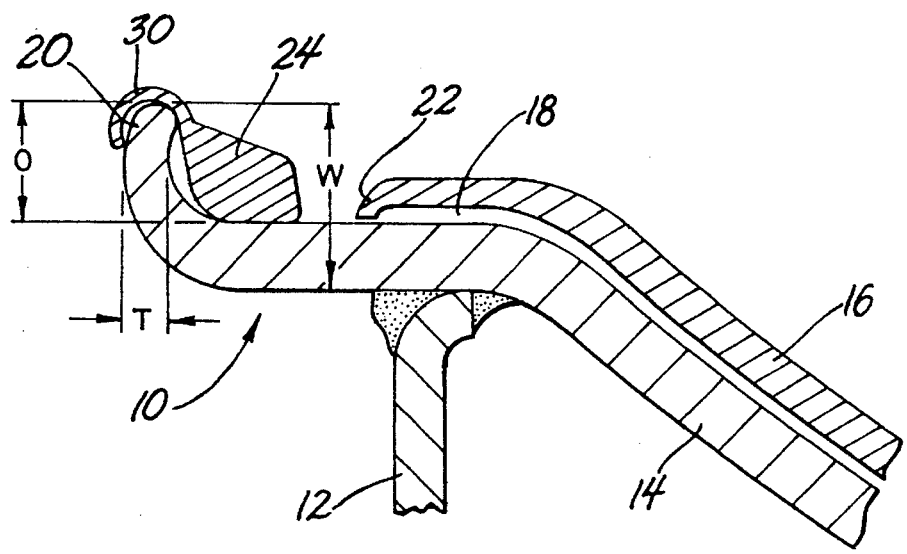
FIG. 1 shows in cross section a rim portion of an automotive wheel on which an overlay is adhered in accordance with the prior art.

As shown in FIG. 2, an outer peripheral portion of the overlay 116 situated radially inward from the overlay lip 122 is sandwiched between the balance weight 124 and the balance weight area of the rim flange 114. In order to accommodate the balance weight 124, the outboard distal edge of the flange lip 120 is offset from the wheel's outboard surface, as measured in the wheel's axial direction, by an offset dimension that is sufficient to accommodate both the balance weight 124, the thickness of the overlay 116 in the region beneath the balance weight 124, and the width of the gap 118. consequently, the flange lip 120 axially extends a distance $OE_1$ greater than that of the prior art shown in FIG. 1. For P, C, T and MC-type weights, the flange lip 120 must extend about 9.3 to about 11.7 millimeters from the outboard surface of the overlay 116.

In order to further accommodate the balance weight 124, the flange lip 120 must also be configured to have a thickness in the radial direction that, when combined with the radial thickness of the overlay lip 122 and the gap 118, enables the balance weight 124 to be mounted to the wheel assembly 110 such that the overlay lip 122 is sandwiched between the balance weight 124 and the balance weight area of the flange lip 120. For this purpose, the radial thickness of the flange lip 120 is reduced from that conventionally provided in the prior art. Specifically, the combined thickness TE of the flange lip 120, the gap 118 and the overlay lip 122 must be about 2.67 to about 3.81 millimeters for a P-type weight, about 2.03 to about 2.67 millimeters for a C-type weight, about 3.43 to about 4.83 millimeters for a T-type weight, and about 4.57 to about 5.21 millimeters for an MC-type weight, according to proposed standards.

From the above, it can be seen that the wheel assembly illustrated in FIG. 2 is uniquely configured to enable a standard balance weight 124 to be mounted to its flange lip 120. Specifically, the axial dimension $OE_1$ of the flange lip 120 is greater than that for a flange lip of a prior art wheel, while the radial thickness of the flange lip 120 is decreased relative to that for a prior art wheel. These dimensions are altered sufficiently to result in the combination of the rim flange 114 and overlay 116 having dimensions within that prescribed for standard wheels for the purpose of accommodating a particular standardized style of balance weight. The result is a wheel assembly 110 having an overlay 116 that conceals essentially the entire outboard surface of the wheel, including the contoured radially inward outboard surface 132 of the flange lip 120.

Figure 3:
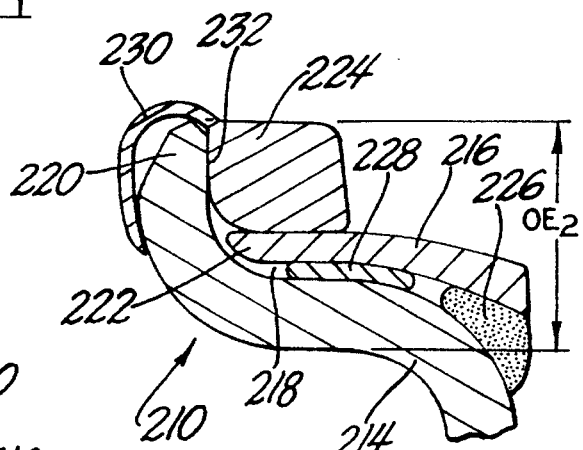

FIG. 3 illustrates a second embodiment of a wheel assembly 210 in accordance with this invention. As with FIG. 2, FIG. 3 represents in partial cross-section a rim portion of the wheel assembly 210 that includes a rim flange 214 terminating in a flange lip 220. As before, the wheel assembly 210 also includes a thin gauge, solid panel overlay 216. In contrast to the embodiment of FIG. 2, the perimeter 222 of the overlay 216 radially extends up to, but not to the outboard most edge of the flange lip 220, such that the contoured radially inward outboard surface 232 of the flange lip 220 remains exposed to view. While the overlay 216 does not completely cover the exposed outboard surfaces of the wheel, a portion of the balance weight area of the rim flange 214 is concealed, such that coverage is significantly greater than that made possible with prior art overlays, resulting in an enhanced aesthetic appearance for the wheel assembly 210. Importantly, the perimeter 222 of the overlay 216 lies at the intersection of the outboard surface of the wheel and the flange lip 220, such that the border of the overlay 216 is obscured and therefore not readily noticeable to a casual observer.

As also shown in FIG. 3, the wheel assembly 210 further includes adhesive 226 and 228 that is selectively deposited within the gap 218 between the overlay 216 and the rim flange 214 for the purpose of permanently securing the overlay 216 to the wheel and preventing the ingress of water and dirt between the overlay 216 and the wheel as well as to ensure a close fit between the perimeter 222 of the overlay and the flange lip 220 as disclosed in the above mentioned co-pending patent application. The adhesive 228 is preferably chosen for its ability to form a water-tight seal around the perimeter of the overlay 216, while the adhesive 226 may be a foamable adhesive in order to more readily fill large voids between the overlay 216 and wheel without contributing excessive weight to the wheel assembly 210.

As with the previous embodiment of FIG. 2, the outboard distal edge of the flange lip 220 must be offset from the overlay's outboard surface, as measured along the wheel's axial direction, by a distance $OE_2$ that is sufficient to accommodate a balance weight 224, shown here as an MC-type weight for an aluminum wheel. Accordingly, the flange lip 220 extends axially from the wheel's outboard surface a distance $OE_2$ sufficient to enable the offset dimension to accommodate the balance weight 224, the thickness of the overlay perimeter 222, and the width of the gap 218. In order to accurately control the offset dimension of the flange lip 220, a preferred adhesive material for the adhesive 228 is an adhesive tape whose thickness dictates the width of the gap 218.

Figure 4:
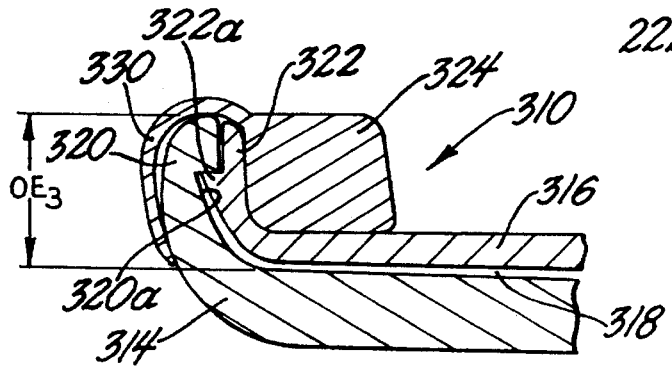

A third embodiment of this invention is shown in FIG. 4, and constitutes a variation of the embodiment of FIG. 2. FIG. 4 represents a rim portion of a wheel assembly 310, in which the rim flange 314 has a recess or undercut 320a formed in its flange lip 320, while the overlay 316 has a radially outward corresponding extending projection 322a formed on its overlay lip 322 for engaging the recess 320a. The interlocking recess 320a and projection 322a serve to secure accurate alignment of the edge of the overlay 316 with the edge of the flange lip 320 while also preventing ingress of water and dirt between the overlay 316 and wheel. As with the previous embodiments, the outboard distal edge of the flange lip 320 is offset from the overlay's outboard surface, as measured in the wheel's axial direction, by a distance $OE_3$ that is sufficient to accommodate a balance weight 324. Accordingly, the flange lip 320 axially extends from the wheel's outboard surface a distance $OE_3$ sufficient to yield an offset dimension that accommodates the balance weight 324, the thickness of the overlay 316 beneath the balance weight 324, and the width of a gap 318 between the overlay 316 and the outboard surface of the wheel.

Figure 5:
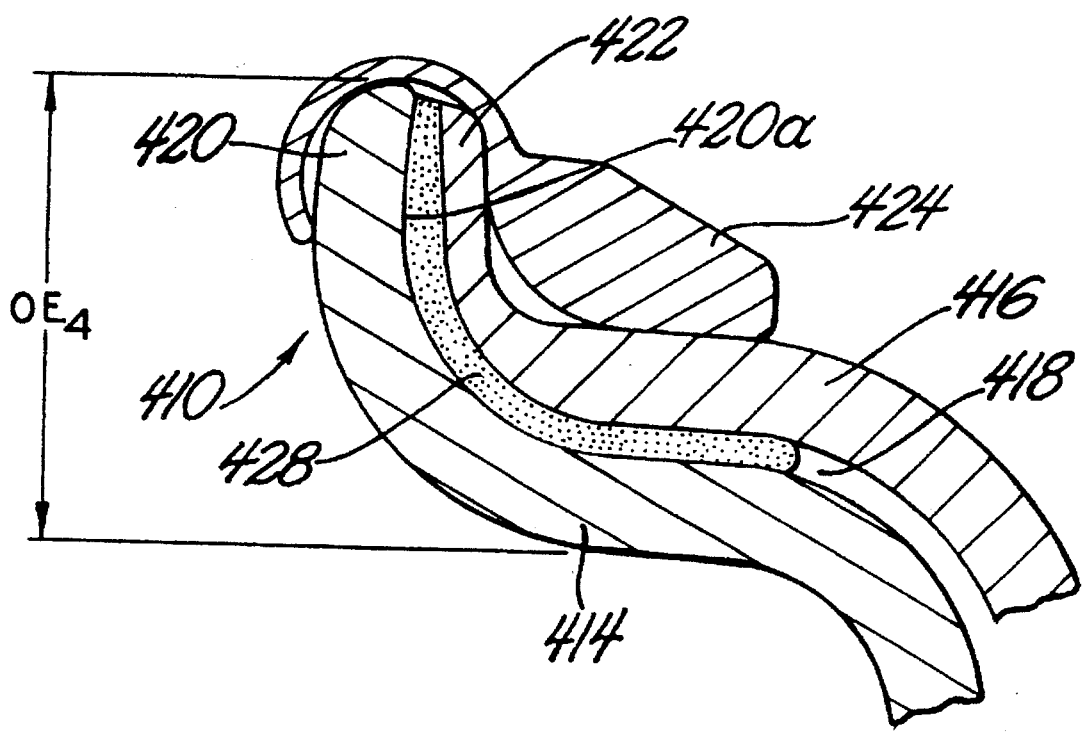

A final illustrated variation of the embodiment of FIG. 2 is shown in FIG. 5. A rim portion wheel assembly 410 is shown having a rim flange 414 and flange lip 420 configured similarly to that of FIG. 2. The wheel assembly 410 includes an overlay 416 having an overlay lip 422 that completely conceals the contoured radially inward outboard surface 420a of the flange lip 420. In contrast to the embodiments of FIGS. 2 and 4, the overlay lip 422 and flange lip 420 are not configured to interlock or otherwise abut to form a physical barrier. Instead, a color coordinated weather-resistant adhesive 428 is disposed between the flange and overlay lips 420 and 422 in order to prevent ingress of water and dirt contaminants. In accordance with this invention, the outboard distal edge of the flange lip 420 is offset from the wheel's outboard surface, as measured in the wheel's axial direction, by an offset dimension $OE_4$ that is sufficient to accommodate a balance weight 424, the thickness of the overlay 416 beneath the balance weight 424, and the thickness of the adhesive 428.

In view of the above, it can be seen that the embodiments illustrated in FIGS. 2 through 5 illustrate novel wheel assemblies that are specifically configured to accommodate various arrangements of overlays on an outboard surface of a wheel, such that a noticeable enhancement can be achieved in the overlay's decorative effect. Simultaneously, the wheel's rim flange and the overlay are both adapted to enable industry standard balance weights to be readily and reliably mounted to the flange, so as to permit proper balancing of the wheel and overlay assembly. To achieve the latter, the wheel and overlay are complementarily configured to permit the overlay to extend to the outer diameter of the wheel and, if desired, to cover the contoured radially inward outboard surface of the flange lip in order to maximize the aesthetic effect of the overlay, without altering the dimensional characteristics necessary to allow a standard balance weight to be mounted to the flange lip. The result is a wheel and overlay assembly whose appearance is dominated by the overlay and whose two-piece construction is more fully concealed because exposure of the wheel's outboard surface is minimized. As such, the perceived value of the wheel assembly is enhanced.

Another significant advantage is that the wheel and overlay assembly utilizes an overlay of the type formed separately from the wheel to which it is mounted, such that manufacturing and assembly are facilitated. In particular, the overlay is preferably a solid plastic panel member that can be bonded directly to the outboard surface of both aluminum and steel wheels. As such, the thickness of the overlay and any gap between the overlay and wheel can be closely controlled in order to appropriately accommodate a balance weight. Finally, the wheel and overlay assembly enables the use of standardized balance weights of the type used in the industry, such that specially designed balance weights are unnecessary.

While the invention has been described in terms of preferred embodiments, it is apparent that other forms could be adopted by one skilled in the art. Accordingly, the scope of the invention is to be limited only by the following claims.

What is claimed is:

1. A wheel and overlay assembly comprising:
   a wheel having an outboard surface and a flange formed at an outer peripheral region thereof, said flange having a flange wall thickness in an axial direction relative to said wheel, said flange having an axially-extending flange lip circumscribing said outboard surface, said flange lip defining a radially inward surface, a flange lip thickness in a radial direction relative to said wheel, and a flange offset dimension between an outboard distal end of said flange lip and said outboard surface as measured in said axial direction, said flange and said flange lip defining a wheel balance weight area on said wheel; and an overlay secured to said wheel, said overlay having a substantially uniform thickness body portion and an outer peripheral edge portion circumscribing said overlay and having a thickness varying from said substantially uniform thickness, said outer peripheral edge portion extending up to said flange lip such that said outer peripheral edge portion of said overlay covers at least a portion of said wheel balance weight area;

whereby said flange offset dimension of said flange lip is a predetermined dimension to accommodate a balance weight and said outer peripheral edge portion of said overlay such that said outer peripheral edge portion of said overlay is between said balance weight and said flange.

2. The wheel and overlay assembly of claim 1 wherein said outer peripheral edge portion of said overlay contacts said flange lip.

3. The wheel and overlay assembly of claim 1 wherein substantially all of said radially inward surface of said flange lip remains exposed by said outer peripheral edge portion of said overlay.

4. The wheel and overlay assembly of claim 1 wherein said outer peripheral edge portion of said overlay covers all of said wheel balance weight area.

5. The wheel and overlay assembly of claim 1 wherein said outer peripheral edge portion of said overlay comprises an axially-extending overlay lip circumscribing said overlay, said overlay lip covering said radially inward surface of said flange lip, said overlay lip defining said varying thickness, said flange lip thickness and said overlay lip varying thickness having a combined thickness that enables said balance weight to be secured to said wheel and overlay assembly such that said overlay lip is between said flange lip and said balance weight.

6. The wheel and overlay assembly of claim 5 further comprising an adhesive disposed at least between said overlay lip and said flange lip.

7. The wheel and overlay assembly of claim 5 wherein said overlay lip has a radially outward extending projection engaging said flange lip so as to delimit a radial gap between said overlay lip and said flange lip.

8. The wheel and overlay assembly of claim 5 wherein said radially inward surface of said flange lip has a radially inward extending projection engaging said overlay lip so as to delimit a radial gap between said overlay lip and said flange lip.

9. The wheel and overlay assembly of claim 8 wherein said overlay lip has a projection extending radially outward into said radial gap, said projection further engaging said flange lip.

10. The wheel and overlay assembly of claim 1 wherein said balance weight is selected from the group consisting of P, C, T and MC-type balance weights.

11. A wheel and overlay assembly comprising:

a wheel having an outboard surface and a flange formed at an outer peripheral region thereof, said flange having a flange wall thickness in an axial direction relative to said wheel, said flange having an axially-extending flange lip circumscribing said outboard surface, said flange lip defining a radially inward surface, a flange lip thickness in a radial direction relative to said wheel, and a flange offset dimension between an outboard distal end of said flange lip and said outboard surface as measured in said axial direction; and an overlay permanently secured to said wheel, said overlay having a substantially uniform thickness body portion and an outer peripheral edge portion having a thickness varying from said substantially uniform thickness, said outer peripheral edge portion covering said outer peripheral region of said outboard surface, said outer peripheral edge portion having an extending overlay lip circumscribing said overlay and extending up to said radially inward surface of said flange lip;

whereby said flange offset dimension of said flange lip is a predetermined dimension to accommodate a balance weight and said outer peripheral edge portion of said overlay, and whereby said flange lip thickness and said overlay lip thickness have a combined thickness that enables said balance weight to be secured to said wheel and overlay assembly such that said overlay lip is between said flange lip and said balance weight.

12. The wheel and overlay assembly of claim 11 wherein said outer peripheral edge portion of said overlay contacts said flange lip.

13. The wheel and overlay assembly of claim 11 further comprising an adhesive disposed at least between said overlay lip and said flange lip.

14. The wheel and overlay assembly of claim 13 wherein said adhesive is a weather-resistant sealant.

15. The wheel and overlay assembly of claim 11 wherein said overlay lip has a distal edge, said distal edge having a radially outward extending projection engaging said flange lip so as to delimit a radial gap between said overlay lip and said flange lip.

16. The wheel and overlay assembly of claim 11 wherein said radially inward surface of said flange lip has a radially inward extending projection engaging said overlay lip so as to delimit a radial gap between said overlay lip and said flange lip.

17. The wheel and overlay assembly of claim 16 wherein said overlay lip has a projection extending radially outward into said radial gap, said projection further engaging said flange lip.

18. A wheel and overlay assembly comprising:

a wheel having an outboard surface and a flange formed at an outer peripheral region thereof, said flange having a flange wall thickness in an axial direction relative to said wheel, said flange having an axially-extending flange lip circumscribing said outboard surface, said flange lip defining a radially inward surface, a flange lip thickness in a radial direction relative to said wheel, and a flange offset dimension between an outboard distal end of said flange lip and said outboard surface as measured in said axial direction, said flange and said flange lip defining a wheel balance weight area of said wheel; and an overlay permanently secured to said wheel, said overlay having a substantially uniform thickness body portion and an outer peripheral edge portion having a thickness varying from said substantially uniform thickness, said outer peripheral edge portion covering a portion of said wheel balance weight area of said wheel, said outer peripheral edge portion extending up to said flange lip such that said radially inward surface of said flange lip remains exposed;

whereby said flange offset dimension of said flange lip is a predetermined dimension to accommodate a balance weight and said outer peripheral edge portion of said overlay such that said outer peripheral edge portion of said overlay is between said balance weight and said flange.

19. The wheel and overlay assembly of claim 18 further comprising an adhesive disposed at least between said flange and said outer peripheral edge portion of said overlay.

20. The wheel and overlay assembly of claim 19 wherein said adhesive is an adhesive tape, said adhesive tape having a thickness so as to delimit an axial gap between said flange and said outer peripheral edge portion of said overlay.

* * * * *

UNITED STATES PATENT AND TRADEMARK OFFICE
CERTIFICATE OF CORRECTION

PATENT NO. : 5,564,791
DATED : October 15, 1996
INVENTOR(S) : Chase et al

It is certified that error appears in the above-indentified patent and that said Letters Patent is hereby corrected as shown below:

Column 5, Line 60, delete "peripheral" insert ---- peripheral edge ----.

Column 6, Line 34, delete "consequently" insert ---- Consequently ----.

Column 7, Line 6, delete "cross-section" insert ---- cross section ----.

Signed and Sealed this

Fourteenth Day of January, 1997

Attest:

BRUCE LEHMAN

Attesting Officer

Commissioner of Patents and Trademarks